(12) United States Patent
Deprun (10) Patent No.: US 9,300,739 B2
(45) Date of Patent: Mar. 29, 2016

(54) METHOD AND DEVICE FOR SHARING OBJECTS IN SERVICE GROUPS OF CPNS ENABLER

(75) Inventor: Jean-Francois Deprun, Paris (FR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 13/394,037

(22) PCT Filed: Jun. 17, 2010

(86) PCT No.: PCT/KR2010/003919
§ 371 (c)(1),
(2), (4) Date: Jun. 4, 2012

(87) PCT Pub. No.: WO2011/040695
PCT Pub. Date: Apr. 7, 2011

(65) Prior Publication Data
US 2012/0239733 A1 Sep. 20, 2012

Related U.S. Application Data (60) Provisional application No. 61/247,570, filed on Oct. 1, 2009.

(51) Int. Cl.
*G06F 15/16* (2006.01)
*H04L 29/08* (2006.01)
*G06Q 10/10* (2012.01)

(52) U.S. Cl.
CPC ............... *H04L 67/16* (2013.01); *H04L 67/10* (2013.01); *G06Q 10/10* (2013.01)

(58) Field of Classification Search
CPC ..................... H04L 41/0213; H04L 29/08144; H04L 29/08072; H04L 63/08; H04L 67/16; H04L 67/10; G06Q 10/10; H04M 3/56; G06F 9/5061; Y02B 60/142

USPC ......... 709/223, 226, 204, 217, 203, 221, 224; 713/168; 379/202.01; 707/8, 9; 717/116; 455/518; 370/338
See application file for complete search history.

(56) References Cited

U.S. PATENT DOCUMENTS 6,292,798 B1 * 9/2001 Dockter et al.
7,451,434 B1 * 11/2008 Blumenthal et al. .......... 717/116
(Continued)

FOREIGN PATENT DOCUMENTS

KR 10-2006-0024683 A 3/2006
WO WO 2007/091791 A1 8/2007

OTHER PUBLICATIONS

Open Mobile Alliance, Doc# OMA-REQ-CPNS-2008-0048R03, Dec. 8, 2008, p. 2.*

*Primary Examiner* — Oleg Survillo
*Assistant Examiner* — Schquita Goodwin
(74) *Attorney, Agent, or Firm* — Birch, Stewart, Kolasch & Birch, LLP (57) ABSTRACT

A method and device for creating service groups and sharing objects within the service groups in a CPNS enabler are discussed. According to an embodiment, a method includes transmitting a first request to create a new CPNS service group to the CPNS server; receiving a second request to provide member information for the CPNS service group from the CPNS server in response to the first request; transmitting the member information for the CPNS service group to the CPNS server in response to the second request, the member information being used to create the CPNS service group and being stored in association with the CPNS service group in the CPNS server; and receiving a response indicating the creation of the CPNS service group from the CPNS server.

20 Claims, 7 Drawing Sheets

(56) References Cited

U.S. PATENT DOCUMENTS

| | | | |
|---|---|---|---|
| 8,761,140 B2 * | 6/2014 | Yang | H04W 4/203 370/338 |
| 2002/0087678 A1 * | 7/2002 | Padilla | 709/223 |
| 2005/0238156 A1 * | 10/2005 | Turner | 379/202.01 |
| 2007/0124374 A1 * | 5/2007 | Arun et al. | 709/204 |
| 2007/0162588 A1 * | 7/2007 | Wu et al. | 709/223 |
| 2007/0185957 A1 * | 8/2007 | Mandalia et al. | 709/204 |
| 2007/0197250 A1 * | 8/2007 | Kies et al. | 455/518 |
| 2008/0052514 A1 * | 2/2008 | Nakae | 713/168 |
| 2008/0320144 A1 * | 12/2008 | Stewart et al. | 709/226 |
| 2009/0106389 A1 * | 4/2009 | Hakkarainen et al. | 709/217 |
| 2009/0113027 A1 | 4/2009 | Gomyo et al. | |
| 2009/0222538 A1 * | 9/2009 | Takahashi et al. | 709/221 |
| 2009/0282043 A1 * | 11/2009 | Dharmavaram et al. | 707/8 |
| 2010/0332647 A1 * | 12/2010 | Agulnik et al. | 709/224 |
| 2013/0041995 A1 * | 2/2013 | Yao | H04L 41/50 709/223 |

* cited by examiner

Fig. 1

PRIOR ART

(a) Service Group Table

| Object A | Service Group 1 |
|---|---|

(b) Device Service Group Table

| Service Group 1 | Device 1 |
|---|---|
| Service Group 1 | Device 2 |
| Service Group 1 | Device 3 |

(c) Administrator Service Group Table

| Service Group 1 Administrator | Device 1 |
|---|---|

(d) Administrator Service Group Table

| Service Group 1 Administrator | Device 1 | All rights |
|---|---|---|
| Service Group 1 Administrator | Device 3 | No Rights |
| Service Group 1 Administrator | Device 2 | Add/remove applications |
| Service Group 1 Administrator | CPNS Server | Remove Service Group |
| Service Group 1 Administrator | Application/External Server | Add/remove application |

(e) Service Group Table

| Object 1 | Service Group 1 | All permit |
|---|---|---|
| Object 1 | All other service groups (except for SG1) | Not allowed |
| Object 2 | Service Group 1 | Ask administrator |
| Object 3 | Service Group 1 | Ask application server |
| Object 4 | Service Group 2 | Ask application server |

METHOD AND DEVICE FOR SHARING OBJECTS IN SERVICE GROUPS OF CPNS ENABLER

CROSS REFERENCE TO RELATED APPLICATIONS

This application is the National Phase of PCT/KR2010/003919 filed on Jun. 17, 2010, which claims priority under 35 U.S.C. 119(e) to U.S. Provisional Application No. 61/247,570 filed on Oct. 1, 2009, all of which are hereby expressly incorporated by reference into the present application.

TECHNICAL FIELD

The present invention relates to sharing objects within service groups of a Converged Personal Network Service (CPNS) enabler.

BACKGROUND ART

Among various technologies being developed, Converged Personal Network Service (CPNS) is a service that allows devices in one Personal Network (PN) to access services outside that PN, e.g., another PN or other network. Generally the CPNS is implemented by a CPNS enabler which can include a CPNS server, one or more Gateways (GWs), and one or more PNEs (Personal Network Elements). A PN GW (or CPNS GW) generally connects one PN to another PN, e.g., using a mobile communication network. A PNE is a basic component that makes up a PN, and can be a single device or a group of devices. These components and general operations of the CPNS are also discussed in Open Mobile Alliance (OMA) telecommunications standards documents.

Figure 1:
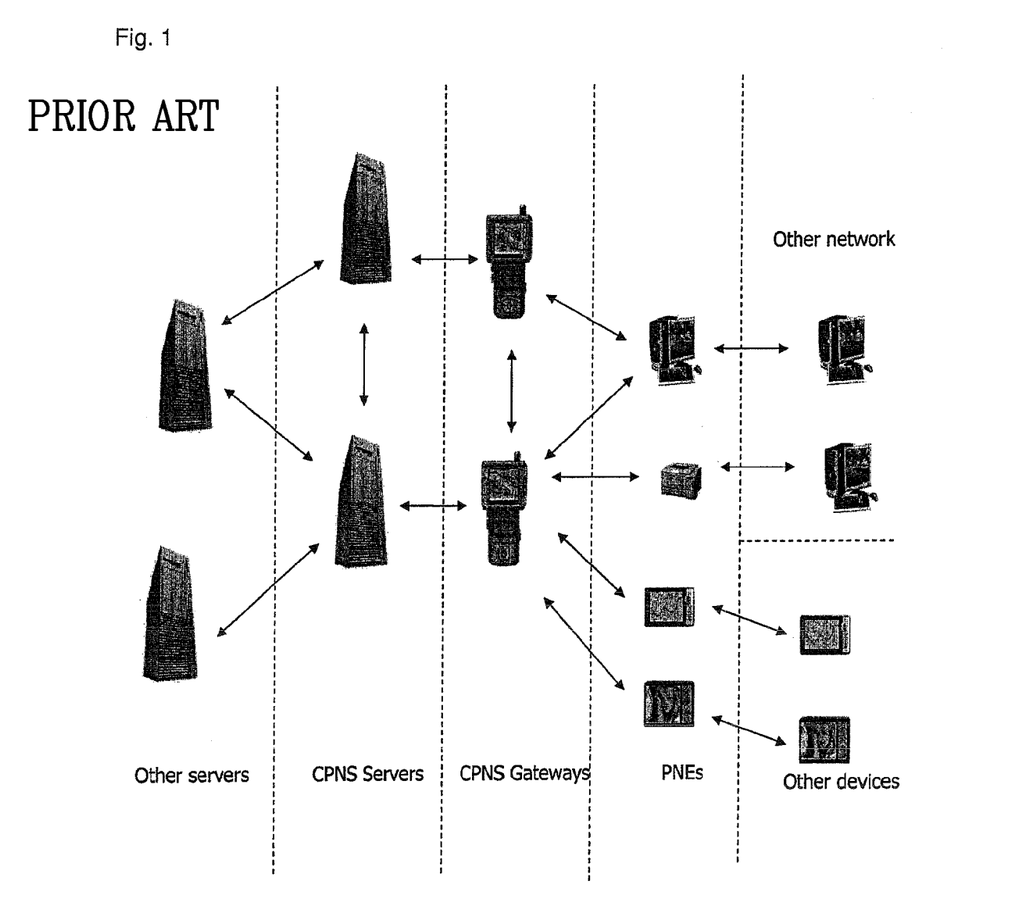
FIG. 1 is a diagram of a CPNS enabler according to a related art.

FIG. 1 illustrates an example of a CPNS enabler according to a related art. As shown in FIG. 1, a CPNS server can communicate and exchange data with one or more PN gateways, each of which in turn can communicate and exchange data with one or more PNEs in a PAN (Personal Area Network).

Each of the PNEs can communicate and exchange data with the PN gateways, other devices or PNEs in other networks, etc. Each of the PN gateways can communicate and exchange data with the CPNS servers, other PN gateways, PNEs, etc. Each CPNS server can also communicate with other servers, gateways, etc. For instance, the CPNS server and the PN gateway (e.g., mobile phone) can communicate with each other through a cellular network, while the PN gateway can communicate with the PNEs through the WPAN such as BLUETOOTH, NFC, WiBree, WI-FI, etc. Generally communications between the CPNS servers, gateways, and PNEs are carried out using known networks and techniques, e.g., BLUETOOTH, 802.11, WI-FI, WPAN (Wireless Personal Area Network), cellular networks such as 3GPP, etc.

The CPNS server generally manages and controls communications among the PN gateways and PNEs so that applications and information among these units of the CPNS enabler may be shared with each other as needed to enhance the user experience. For instance, in FIG. 1, according to the CPNS service of the CPNS enabler, a user at one PNE (e.g., Portable Multimedia Player—PMP) can view GPS (Global Positioning System) information which is received from another PNE (e.g., GPS device) through a PN gateway (e.g., cellular phone). As a result, the user can have access to a more variety of services that are offered within the user's current PAN as well as outside the PAN.

The CPNS server also allows different services groups to be formed and operated, which has been proposed in the OMA telecommunications standards documents. Same information and applications are then shared within the service groups.

Figure 2:
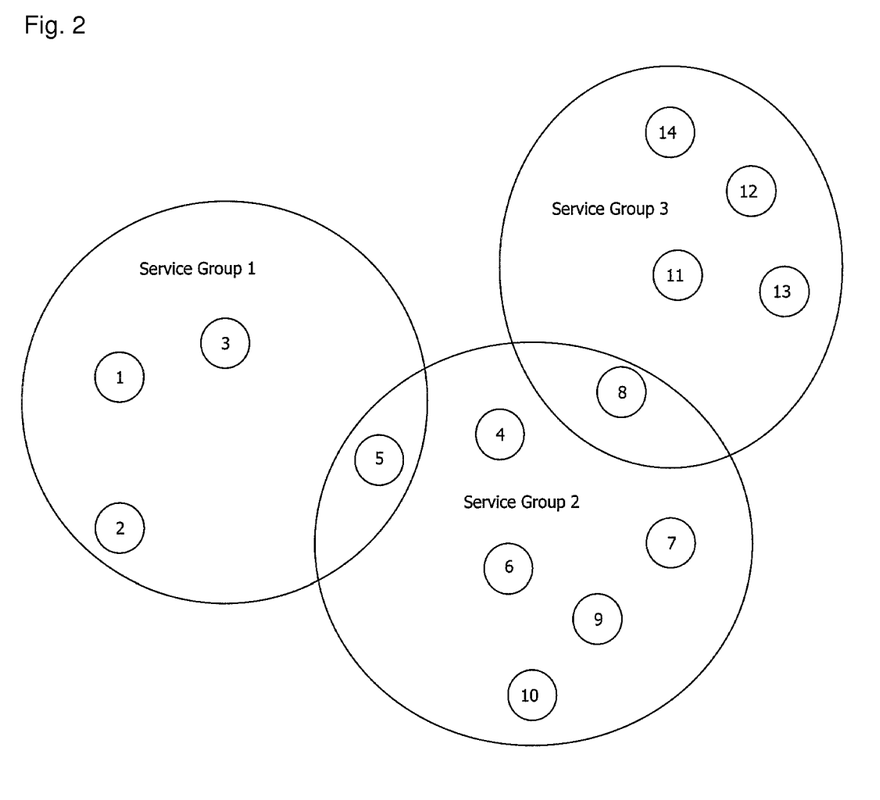
FIG. 2 is a diagram of service groups within a CPNS enabler according to the related art.

Although the CPNS enabler according to the related art provides various advantageous services including the service groups, improvements on the CPNS enabler can be made to provide further enhanced CPNS services. For instance, objects (e.g., applications) within one service group is shared with all the members of that service group. However, when multiple service groups are formed, one or more members (CPNS entity) may belong to multiple service groups and as a result, same objects are automatically shared among multiple service groups, which may not be desired. In the example of FIG. 2, the CPNS entity 5 belongs to both the Service Group 1 and Service Group 2. Similarly, the CPNS entity 8 belongs to both the Service Group 2 and Service Group 3. Then, an object (e.g., new application) uploaded by the CPNS entity 1 of the Service Group 1 will be shared with all the members of the Service Group 1 including the CPNS entity 5. But since the CPNS entity 5 also belongs to the Service Group 2, the same will then be shared with all the members of the Service Group 2. This unintended sharing of objects among multiple service groups is not desirable and may cause valuable resources to be undesirable shared (e.g., from the perspective of the application server) and wasted.

DISCLOSURE OF INVENTION

Solution to Problem

The present invention provides an enhanced converged personal network service (CPNS) service by controlling how objects are shared among service groups within a CPNS enabler.

The present invention allows a method and device for sharing objects among service groups of a CPNS enabler, which address the limitations and disadvantages associated with the related art.

According to one aspect, the present invention provides a method for creating a service group in a CPNS enabler, the CPNS enabler including a CPNS server and a plurality of CPNS entities, the method performed by one of the CPNS entities and comprising: transmitting a first request to create a new CPNS service group to the CPNS server; receiving a second request to provide member information for the CPNS service group from the CPNS server in response to the first request; transmitting the member information for the CPNS service group to the CPNS server in response to the second request, the member information being used to create the CPNS service group and being stored in association with the CPNS service group in the CPNS server; and receiving a response indicating the creation of the CPNS service group from the CPNS server.

According to another aspect, the present invention provides a method for creating a service group in a CPNS enabler, the CPNS enabler including a CPNS server and a plurality of CPNS entities, the method performed by the CPNS server and comprising: receiving a first request to create a new CPNS service group from one of the CPNS entities; transmitting a second request to provide member information for the CPNS service group to the one of the CPNS entities in response to the first request; receiving the member information for the CPNS service group from one of the CPNS entities in response to the second request, the member information being used to create the CPNS service group and being stored in association with the CPNS service group in the CPNS server; and transmitting a response indicating the creation of the CPNS service group to one of the CPNS entities.

These and other features of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein:

FIGS. 4(A), 4(B), 4(C), 4(D) and 4(E_ are examples of various tables which can be stored in the CPNS server (or other entity) according to an embodiment of the invention;

MODE FOR THE INVENTION

Hereinafter, exemplary embodiments of the invention will be described in detail with reference to the attached drawings. The embodiments described below are intended to exemplify the technical spirit of the invention, but are not intended to limit the scope of the invention.

According to embodiments of the invention, a CPNS enabler preferably includes at least one CPNS server and a plurality of CPNS entities. The CPNS server and CPNS entities are also referred to herein as the units of the CPNS enabler or CPNS units. Each of the CPNS units can include various components, which can include at least one of a receiver/transmitter, a storage/memory, a processor/controller for controlling the operations of the CPNS unit, etc. All the units of the CPNS enabler are operatively coupled and configured, and communicate amongst each other as configured using known networks and techniques, e.g., BLUETOOTH, 802.11, WI-FI, WPAN (Wireless Personal Area Network), cellular networks such as 3GPP, etc. Further, a gateway can become and function as a PNE and vice versa.

According to the embodiments of the invention, the CPNS server controls the operations of the CPNS enabler and stores policy information and/or user preference information associated with each or some of the units of the CPNS enabler. The CPNS entity can be a CPNS gateway (or PN gateway) or PNE (or Device coupled to the PNE). Some examples of the PNEs can be a handset or mobile terminal, GPS, navigation device, MP3 player, audio/video player, PMP (Portable Multimedia Player), handset with GPS, PC (Personal Computer), desktop, computer notebook, printer, computer tablet, scanner, TV, etc. Some examples of the PN gateways can be a mobile terminal or handset, home gateway, smart phone, set top box, desktop, TV, computer notebook, etc.

According to the embodiments of the invention, the CPNS enabler manages the service groups in function of objects. Objects are any content that is communicated within the CPNS enabler. Some examples of the objects, which are not limited thereto, can be applications, images, videos, texts, computer software, menus, data, information, etc. One or more service group administrators are designated for managing a service group, and the service group administer can be the CPNS server or a CPNS entity belong to the corresponding service group. Requests pertaining to the service group may preferably be sent to the administrator for authorization, etc. As a variation, the service groups may be managed by the administrator(s) which may be another server/device or a group of servers/devices. Since the service groups are managed in function of objects, the CPNS enabler according to the invention allows sharing of such objects to occur only within desired service group(s).

Figure 3:
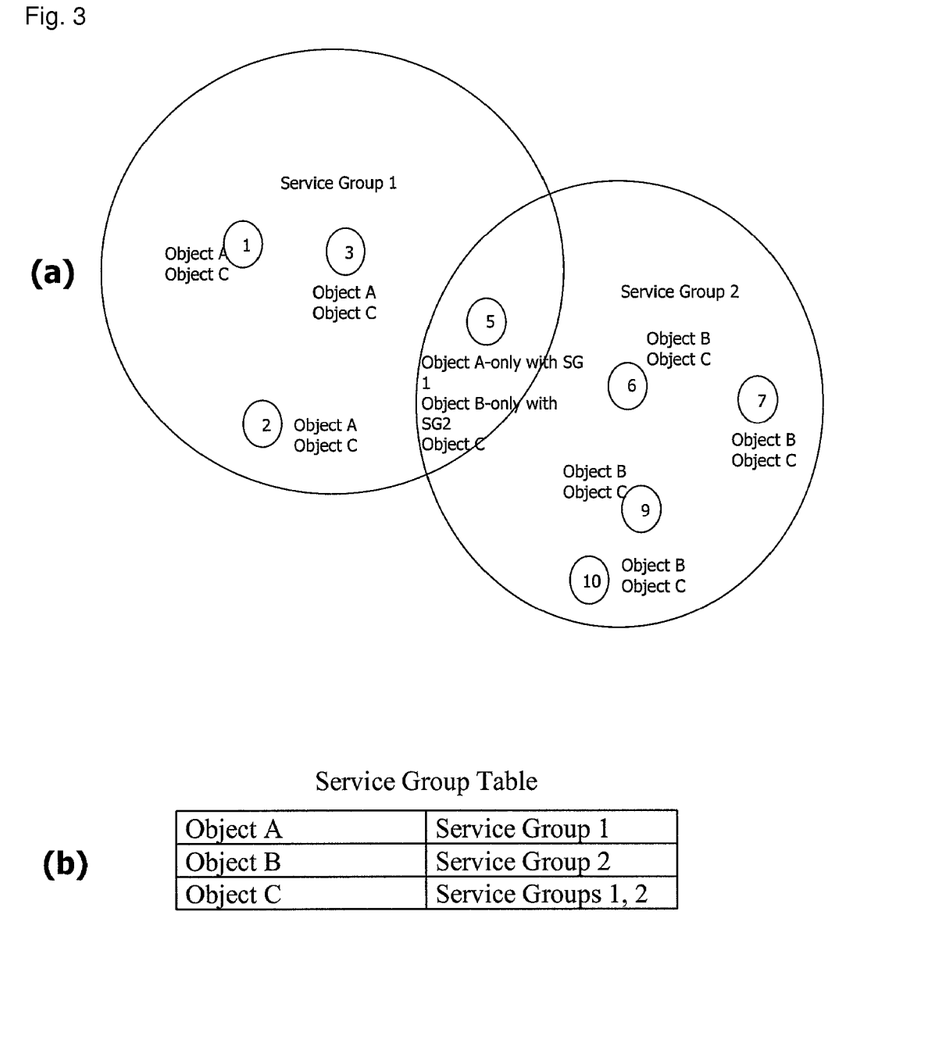
FIG. 3(A) is a diagram of one example of multiple service groups within a CPNS enabler according to an embodiment of the invention.
FIG. 3(B) is an example of a Service Group Table associated with FIG. 3A according to an embodiment of the invention.

FIG. 3(A) is a diagram of one example of multiple service groups within a CPNS enabler according to an embodiment of the invention, and FIG. 3(B) is an example of a Service Group Table for the service groups of FIG. 3(A) according to an embodiment of the invention. The CPNS enabler of FIG. 3(A) can be the CPNS enabler of FIG. 1 or any other CPNS enabler.

As shown in FIG. 3(A), the CPNS enabler includes multiple service groups, e.g., Service Group (SG) 1 and SG 2, where 3 objects (A, B and C) are shared and the CPNS entity 5 belongs to both the SG 1 and SG 2. The CPNS server may control these service groups as the administrator.

In this example, the objects A and C are shared in the SG 1 (among the members of the SG 1, namely the CPNS entities 1, 2, 3 and 5), and the objects B and C are shared in the SG 2 (namely, among the CPNS entities 5, 6, 7, 9 and 10). According to the invention, although the entity 5 may have three objects A, B and C, the object A is not shared within the SG 2 and the object B is not shared within the SG 1. The object C can be shared with the SG 1 and SG 2. This selective sharing of objects among the service groups is accomplished by storing and managing data associated with the service groups in association with the objects and/or administrators, using one or more tables preferably stored and updated in the CPNS server. These tables are also referred to herein as "Service Group Table", "Device Service Group Table" and "Administrator Service Group Table". The Service Group Table identifies objects in association with the service group numbers. The Device Service Group Table identifies service groups in association with the devices/members (e.g., CPNS entities). The Administrator Service Group Table identifies devices that are designated to be the administrators of the service groups and may further identify rights information for each of the administrators.

In the example of FIG. 3(A), a Service Group Table as shown in FIG. 3(B) may be created and stored in the CPNS server. This Table indicates that the object A is to be shared only within the SG 1, the object B is to be shared only within the SG 2, and the object C is to be shared within the SG 1 and SG 2. Since the sharing of the objects is controlled according to the Service Group Table, the objects are selectively shared as desired within the appropriate service groups.

Methods for creating, managing and using such tables to control the sharing of the objects within the service groups of the CPNS according to the embodiments of the invention will now be discussed in more detail referring to the figures.

In a method for creating the tables according to the invention, a user at a CPNS entity, a CPNS server or a CPNS entity can request a creation of a particular service group and select which object(s) the user would like to share within that service group. This information is stored in the Service Group Table as shown in, e.g., FIG. 4(A) which illustrates that the object 1 is to be shared in the SG 1.

Figure 4:
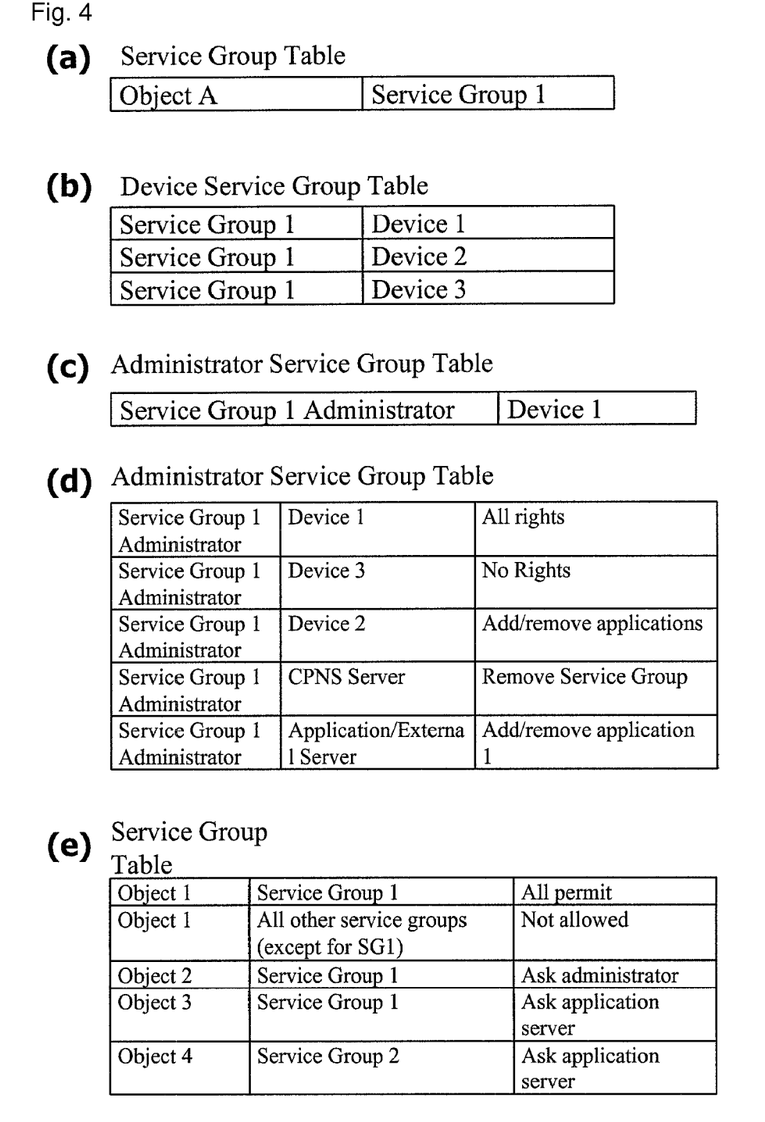

For each service group, the entity that created the service group (or other CPNS unit) can identify the member(s) belonging to that service group, and this information is stored in the Device Service Group Table as shown in, e.g., FIG. 4(B). According to the Device Service Group Table of FIG. 4(B), the SG 1 has Devices 1, 2 and 3 (CPNS entities/units) as its members.

For each service group, the entity that created the service group (or other CPNS unit) can designate the administrator(s) for the service group, and this information is stored in the Administrator Service Group Table as shown in, e.g., FIG. 4(C). According to the Administrator Service Group Table of FIG. 4(C), the Device 1 is the designated administrator of the SG 1. The (designated) administer can make modifications to any of the tables. For instance, the administrator can add, modify or remove objects to or from the service groups in the Service Group Table, add, modify or remove devices/members to or from the service groups in the Device Service Group Table, add, modify or remove other administrator to or from the service groups in the Administrator Service Group Table.

As a variation to the Table of FIG. 4(C), the Administrator Service Group Table can indicate some rights that each administrator can share with other CPNS units (e.g., server, device, PNE, etc.) and FIG. 4(D) shows an example of such table.

As shown in FIG. 4(D), for the service group 1, certain operations managed by the administrator may be shared among multiple parties. For instance, the Device 1 as the SG 1 administrator has all rights, which means the Device 1 can share all contents with all members of the SG 1 and has the rights to authorize all operations/requests. The Device 2 may have some limited rights (e.g., add/remove applications) as the SG 1 administrator. The CPNS server may function as the SG 1 administrator with respect to removing the service group. The application server (e.g., game server, external server, etc.) may function as the SG 1 administrator with respect to adding/removing specification application(s).

In still another variation to FIG. 4(A), the Service Group Table can have additional information as shown in FIG. 4(E). For instance, for each object, conditions (authorization information) for sharing the object within the service group(s) may be imposed, which is identified in the Service Group Table. According to the Service Group Table of FIG. 4(E), for example, the object 3 may not be shared with the SG 1 until the administrator asks the application server.

In the above examples of FIGS. 4(A)-4(D), one service group is discussed. However, the invention is obviously not limited thereto and each of these tables can include information for multiple service groups having different members, objects to share, rights, administrators, etc.

Figure 5:
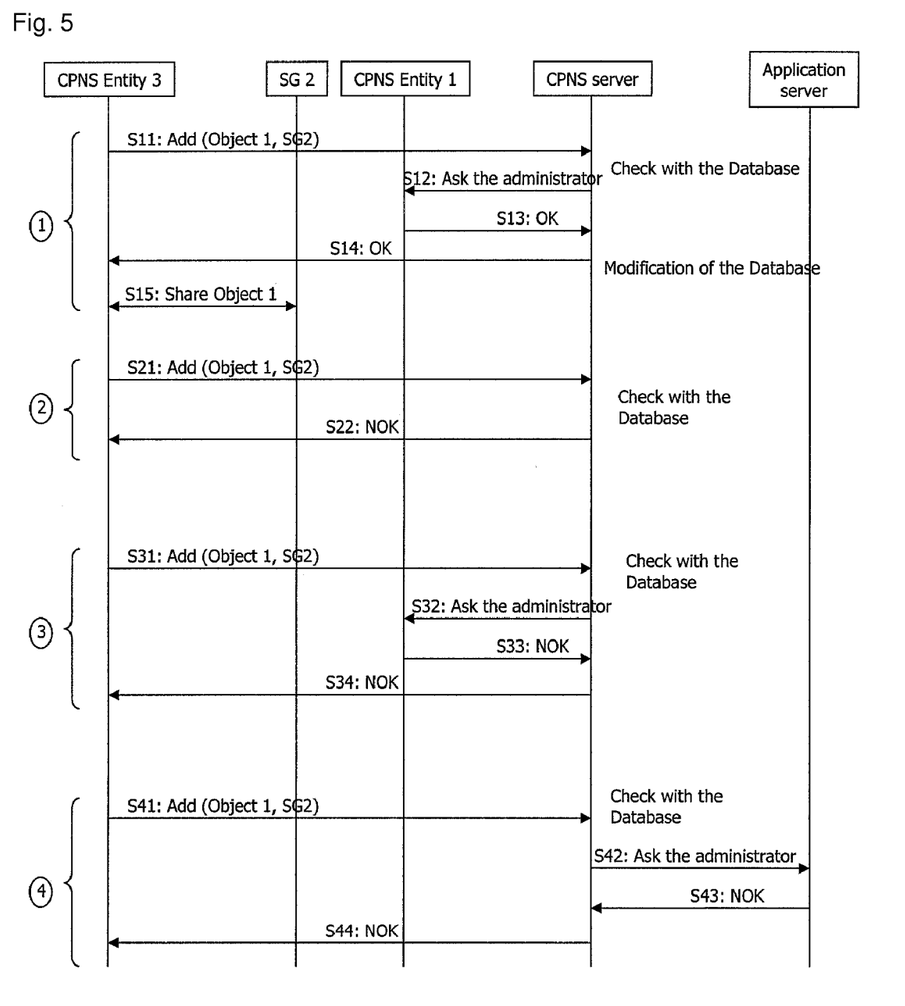
FIG. 5 is a flowchart illustrating various examples of a method of sharing objects within service groups of a CPNS enabler according to an embodiment of the invention.

FIG. 5 illustrates various examples of methods for controlling sharing of an object within service groups of a CPNS enabler according to an embodiment of the invention.

Referring to FIG. 5, the CPNS includes a CPNS server and CPNS entities/devices 1 and 3, and an external server such as an application server may communicate with the CPNS server. In this example, at least the entities 1 and 3 belong to the Service Group 1 of the CPNS enabler, and the entity 3 may or may not belong to the Service Group 2.

In Case 1, the CPNS entity 3 (e.g., user at the entity 3) desires to share the object 1 with the Service Group 2 and thus sends a request to add the Service Group 2 to the list of service groups within which the object 1 can be shared, at step S11. This request is sent to the CPNS server. The CPNS server then looks up the various tables discussed above, and determines how to process this request. In one example, the CPNS server can look at the Administrator Service Group Table as shown in FIG. 4(C), determines that the entity 1 is the administer for the SG 1 and thus sends the request to the entity 1, at step S12. As a slight variation, the CPNS server can look at the Administrator Service Group Table (or other table) which specifically indicates that this operation needs to be asked to the administrator and thus asks the entity 1 (administrator). The entity 1 sends a command/response (e.g., OK) to the CPNS Server to add the Service Group 2 to the service groups where the object 1 can be shared, at step S13. This approval/denial (confirmation response) of the request by the entity 1 can be generated according to a user's input at the entity 1. For instance, when the entity 1 receives the request to add the SG 2 to the object 1's list from the CPNS server, the entity 1 may ask the user at the entity 1 (e.g., via a message, menu, pop-up, etc.) if the user approves or disapproves such addition, which is then sent to the CPNS server. At step S14, the CPNS server then updates the tables/database based on the response received from the entity 1 and notifies the entity 3 about the result. For instance, the Service Group Table may be updated to identify the object 1 in association with the Service Group 2, which means the object 1 can be shared within the Service Group 2. At step S15, the entity 3 can now share the object 1 with the Service Group 2 since the administrator has authorized such sharing.

In Case 2, the entity 3 desires to share the object 1 with the Service Group 2 and sends a request to the CPNS server at step S21 which is the same as step S11. The CPNS server checks the tables/database. In this example, it is assumed that the database indicates that the object 1 cannot be shared with other service groups. For instance, assuming that the Service Group Table as in FIG. 4(E) is stored in the CPNS server, the CPNS server checks the authorization information ('Not Allowed') in the Table and determines that the object 1 cannot be shared with any other service groups. Thus at step S22, the CPNS server refuses the sharing of the object 1 with the Service Group 2 and informs the Device 3 of such result via a confirmation response of NOK (not OK).

Case 3 is the same as Case 1, except that the administrator does not allow the sharing of the object 1 with the Service Group 2. That is, steps S31 and 32 are the same as steps S11 and S12. Then at step S33, the entity 1 (administrator), e.g., the user at the entity 1, decides to not allow the sharing of the object 1 with the Service Group 2, and thus sends a confirmation response (e.g., NOK) indicating such denial. The CPNS server then sends this confirmation response (NOK) to the entity 3 at step S34, whereby the entity 3 cannot share the object 1 with the Service Group 2.

Case 4 is identical to Case 3, except that the designated administrator of the Service Group 1 is the external/application server. That is, steps S41 and S44 are the same as steps S31 and S34 but steps S42 and S43, which are similar to steps S32 and S33, are performed with the external/application server (designated administrator of the Service Group 1).

Obviously, the above Cases 1-4 are mere examples of various scenarios that are possible when using the methods of controlling object sharing within the CPNS service groups according to the invention.

Methods of creating, modifying and removing service groups, objects or members thereof according to the embodiments of the invention will now be discussed in detail referring to FIGS. 6 and 7.

Figure 6:
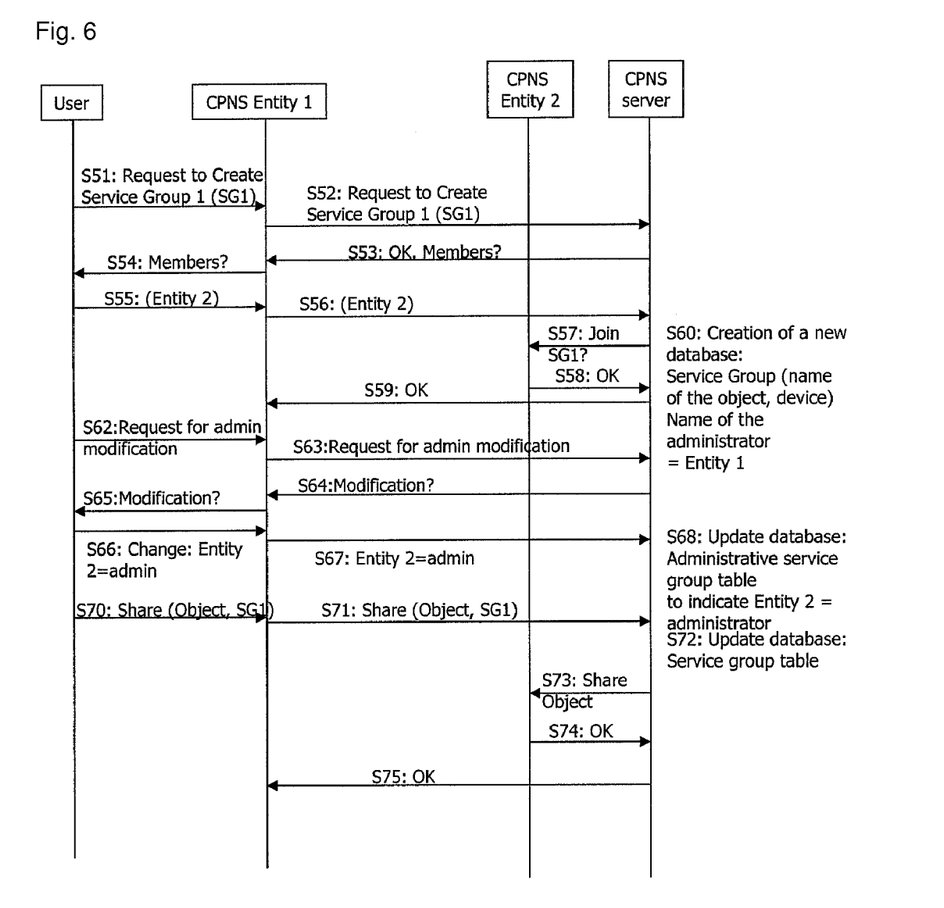
FIG. 6 is a flowchart illustrating a method of creating a service group of a CPNS enabler according to an embodiment of the invention.

FIG. 6 is a flowchart illustrating a method of creating a service group of a CPNS enabler according to an embodiment of the invention.

Referring to FIG. 6, at step S51, a user at the CPNS entity 1 (Device 1) requests to create a Service Group 1, which is then sent to the CPNS server at step S52. The CPNS server approves this request and asks the CPNS entity 1 about the members of the Service Group 1 at step S53 to the CPNS entity 1. The user can input or select who the members should be at steps S54 and S55 (e.g., input can be entered via the user input unit of the entity 1, e.g., keyboard, touch screen, keypad, etc.). In this example, the user identifies a CPNS entity 2 (and the CPNS entity 1 itself) to be part of the SG 1. The entity 1 sends this member information (e.g., entity 2, or entities 1 & 2) to the CPNS server at step S56. The CPNS server asks the entity 2 if the entity 2 desires to join the SG 1 at step S57, and receives a confirmation response (e.g., OK, NOK, etc.) from the entity 2 at step S58. This response from the entity 2 can be based on an input from the user at the entity 2. The CPNS server then creates the SG 1 and updates its database (tables such as the Service Group Table, the Device Service Group Table and the Administrator Service Group Table) as needed to reflect the SG 1 information. The entity 1 may also be designated as the SG 1 administrator in the database. The CPNS server also notifies the entity 1 that the SG 1 as requested by the entity 1 has been created at step S59. The CPNS server may also notify the entity 2 that it belongs to the SG 1.

Subsequently, the user at the entity 1 may request that the administrator for the SG 1 may be changed at step S62. This request for administrator modification is then sent from the entity 1 to the CPNS server at step S63. The CPNS server then checks the database and asks the details on the modification from the entity 1 at step S64. At steps S65-S67, the user at the entity identifies that the entity 2 should be the SG 1 administrator, and this request is sent to the CPNS server from the entity 1. At step S68, the CPNS server updates its database, e.g., the Administrator Service Group Table, to reflect this modification if allowed. The CPNS server may notify the entities 1 and 2 about this change.

When the user at the entity 1 desires to share an object with the SG 1 at step S70, the entity 1 sends a request to share the object with the SG 1 to the CPNS server at step S71. The CPNS server checks its tables and makes any modifications as needed to the tables at step S72. Since at step S68 the Administrator Service Group Table has been updated to designate the entity 2 as the SG 1 administrator, the CPNS server at step S73 asks the SG 1 administrator (entity 2) if such sharing is allowed. The entity 2 (e.g., user at the entity 2) then can authorize such sharing at step S74, which is then communicated to the entity 1 at step 75. As a result, the entity 1 can share the object with the members of the SG 1. Accordingly, the object sharing operations are controlled by the administrator of the service group so that undesirable or automatic object sharing operations may not occur without proper authorization.

Figure 7:
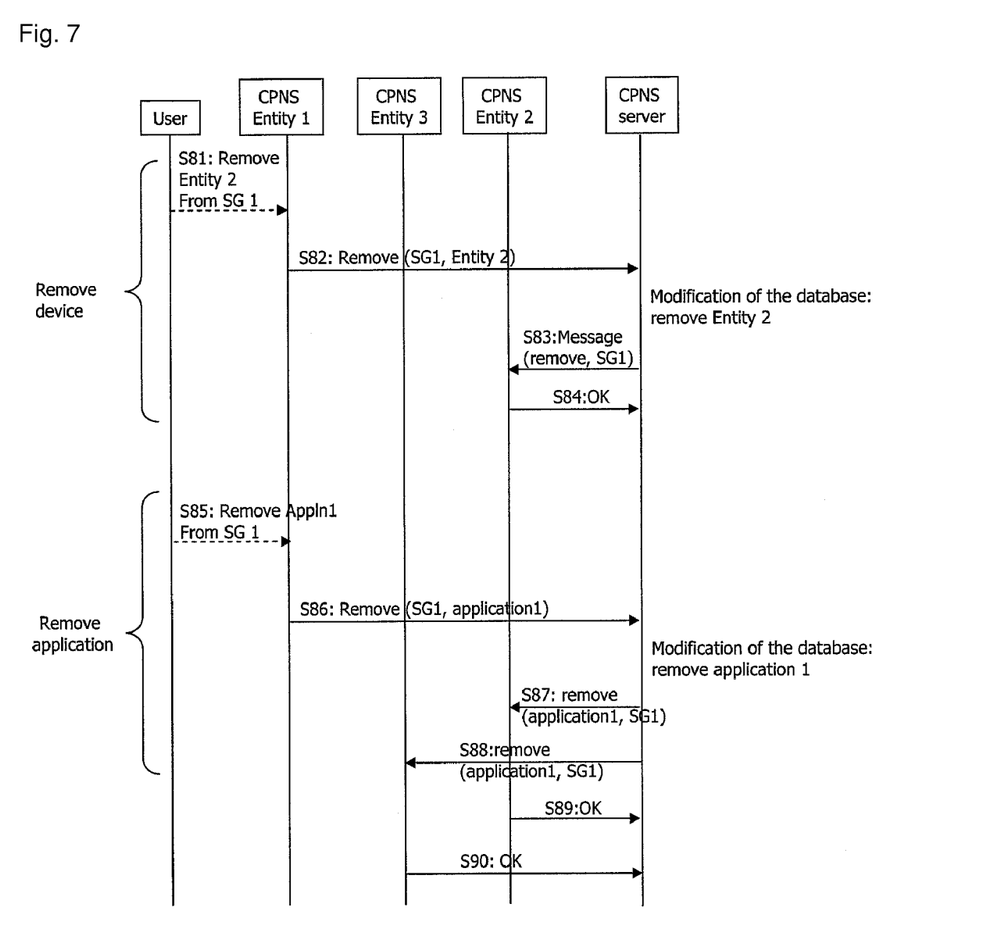
FIG. 7 is a flowchart illustrating a method of removing/modifying a service group of a CPNS enabler according to an embodiment of the invention.

FIG. 7 is a flowchart illustrating a method of removing/modifying a service group of a CPNS enabler according to an embodiment of the invention. Here, it is assumed the CPNS entities 1 and 2 belong to a SG 1 of the CPNS enabler.

Referring to FIG. 7, when a user of the entity 1 desires to remove the entity 2 from the SG 1 at step S81, the entity 1 sends a request to remove the entity 2 from the SG 1 to the CPNS server at step S82. The CPNS server checks the database (tables) and see if such a request can be allowed and if so, updates the tables as needed. If another entity is the designated SG 1 administrator (e.g., entity 2), the CPNS server may ask that administrator for approval/denial of this request at steps S83 and S84. The CPNS server then updates its database as needed, e.g., the Device Service Group table may be updated to remove the entity 2 in association with the SG 1. The CPNS server can notify the entities 1 and 2 (or all members of the updated SG 1) regarding this change.

When the user of the entity 1 desires to remove a particular object (e.g., application 1) from being shared within the SG 1 at step S85, the entity 1 sends a request to remove the application 1 from being shared within the SG 1 to the CPNS server at step S86. The CPNS server checks the database (tables) and see if such a request can be allowed and if so, updates the tables as needed. For instance, the Service Group Table may be updated to remove the application 1 (object) in association with the SG 1. At steps S87-S90, the CPNS server may notify the members of the SG 1 (e.g., entities 2 and 3) regarding this change. In the above examples, the CPNS server may not notify the entity 1 regarding the change or instruct the entity 1 to implement the change since the change is requested by the entity 1. The entity 1 may implement the change when it receives the response from the CPNS server.

In the above, storing and updating the service group data in the tables has been discussed. However, this is merely an example, and such data can be stored and managed in other formats. Further, although such data is preferably stored, updated and managed in the CPNS server, such data may also be stored, updated and managed in one or more of the CPNS entities (e.g., service group administrator) associated with the service groups. Moreover, in the above methods, a response (also referred to herein as a confirmation response) from the administrator, the CPNS server, or other entity in response to any request or message can vary and can be any message, e.g., approved, denied, authorized, OK, NOK, etc.

Accordingly, the invention allows storing and managing of services groups in function of objects and selectively controls sharing of the objects by referring to the database of the CPNS server for effectively serving the service groups of the CPNS enabler.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for managing a service group in a converged personal network service (CPNS) enabler, the CPNS enabler including a CPNS server and a plurality of CPNS entities, the method performed by a CPNS device and comprising:

transmitting, by the CPNS device, a first request to create a first CPNS service group to the CPNS server, wherein the first request includes a CPNS service group number and an object to be shared in the first CPNS service group, wherein a service group table is created by the CPNS server using the CPNS service group number and the object to be shared in the first CPNS service group which are included in the first request when the first request is received, the service group table indicating a relationship between the object to be shared in the first CPNS service group and the CPNS service group number, and the service group table further indicating a condition for sharing the object within the first CPNS service group;

receiving, by the CPNS device, a second request to provide member information for the first CPNS service group from the CPNS server in response to the first request;

transmitting, by the CPNS device, the member information for the first CPNS service group to the CPNS server in response to the second request, wherein the member information identifies one or more CPNS entities that belong to the first CPNS service group, wherein a device service group table is created by the CPNS server using the member information received from the CPNS device when the member information for the first CPNS service group is received, the device service group table indicating a relationship between the first CPNS service group and the one or more CPNS entities;

receiving, by the CPNS device, a first response indicating the creation of the first CPNS service group from the CPNS server;

transmitting, by the CPNS device, administrator information for the first CPNS service group to the CPNS server, wherein the administrator information identifies at least one of the one or more CPNS entities, wherein an administrator service group table is created by the CPNS server using the administrator information received from the CPNS device when the administrator information is received, the administrator service group table indicating that the at least one of the one or more CPNS entities is designated to be an administrator of the first CPNS service group, and the administrator service group table further indicating rights that each of the administrators of the first CPNS service group has;

in response to determining that the condition indicated by the service group table indicates that an authorization of the administrator is required for sharing the object within the first CPNS service group, the CPNS server:
refers to the administrator service group table to identify the administrator of the first CPNS service group, and
checks whether the administrator has rights to authorize the sharing of the object;

in response to determining that the administrator has rights to authorize the sharing of the object, the CPNS server further:
communicates with the administrator of the first CPNS service group to receive approval or denial of sharing the object within the first CPNS service group, and
transmits a first notification to the CPNS device that the object can be shared within the first CPNS service group;

sharing, by the CPNS device, the object within the first CPNS service group based on the first notification received from the CPNS server;

receiving, by the CPNS server, a third request for removing a first CPNS entity from the first CPNS service group;

in response to receiving the third request, the CPNS server:
refers to the device service group table and the administrator service group table to identify an administrator of the first CPNS service group,
communicates with the administrator of the first CPNS service group to receive approval or denial of the third request from the administrator of the first CPNS service group,
updates the device service group table when the third request is approved, and
transmits a second notification indicating a change of the device service group table to members of the first CPNS service group with reference to the updated device service group table;

receiving, by the CPNS device, the second notification from the CPNS server, wherein the object is no longer shared with the first CPNS entity within the first CPNS service group based on the second notification received from the CPNS server;

receiving, by the CPNS server, a fourth request from a second CPNS entity for removing a first object from being shared with a second CPNS service group; and in response to receiving the fourth request, the CPNS server:
refers to the service group table to check whether the fourth request is allowed,
updates the service group table such that the first object is not shared with the second CPNS service group,
sends a change notification of the service group table to members of the second CPNS service group except for the second CPNS entity, and
sends a second response to the second CPNS entity without the change notification.

2. The method of claim 1, further comprising:
transmitting a specific content and a fifth request to share the specific content with the first CPNS service group to the CPNS server, the specific content being stored in association with the first CPNS service group in the CPNS server.

3. The method of claim 2, further comprising:
receiving, from the CPNS server, a third response indicating whether the specific content was shared with the first CPNS service group.

4. The method of claim 1, further comprising:
transmitting service group information for the first CPNS service group to the CPNS server, the service group information being stored in association with the first CPNS service group in the CPNS server.

5. The method of claim 4, wherein the service group information includes authorization information identifying how a request for the first CPNS service group is to be processed.

6. The method of claim 5, further comprising:
receiving a request to authorize a sixth request to share a content with the first CPNS service group, from the CPNS server; and
transmitting a confirmation response to the sixth request to the CPNS server.

7. The method of claim 1, wherein the CPNS device is a gateway or a personal network element (PNE).

8. A method for managing a service group in a converged personal network service (CPNS) enabler, the CPNS enabler including a CPNS server and a plurality of CPNS entities, the method performed by the CPNS server and comprising:
receiving, by the CPNS server, a first request to create a first CPNS service group from a CPNS device, wherein the first request includes a CPNS service group number and an object to be shared in the first CPNS service group,
wherein a service group table is created by the CPNS server using the CPNS service group number and the object to be shared in the first CPNS service group which are included in the first request when the first request is received, the service group table indicating a relationship between the object to be shared in the first CPNS service group and the CPNS service group number, and the service group table further indicating a condition for sharing the object within the first CPNS service group;

transmitting, by the CPNS server, a second request to provide member information for the first CPNS service group to the CPNS device in response to the first request;

receiving, by the CPNS server, the member information for the first CPNS service group from the CPNS device in response to the second request, wherein the member information identifies one or more CPNS entities that belong to the first CPNS service group, wherein a device service group table is created by the CPNS server using the member information received from the CPNS device when the member information for the first CPNS service group is received, the device service group table indicating a relationship between the first CPNS service group and the one or more CPNS entities;

transmitting, by the CPNS server, a first response indicating the creation of the first CPNS service group to the CPNS device;

receiving, by the CPNS server, administrator information for the first CPNS service group from the CPNS device, wherein the administrator information identifies at least one of the one or more CPNS entities, wherein an administrator service group table is created by the CPNS server using the administrator information received from the CPNS device when the administrator information is received, the administrator service group table indicating that the at least one of the one or more CPNS entities is designated to be an administrator of the first CPNS service group, and the administrator service group table further indicating rights that each of the administrators of the first CPNS service group has;

in response to determining that the condition indicated by the service group table indicates that an authorization of the administrator is required for sharing the object within the first CPNS service group, the CPNS server:
refers to the administrator service group table to identify the administrator of the first CPNS service group, and
checks whether the administrator has rights to authorize the sharing of the object;

in response to determining that the administrator has rights to authorize the sharing of the object, the CPNS server further:
communicates with the administrator of the first CPNS service group to receive approval or denial of sharing the object within the first CPNS service group, and
transmits a first notification to the CPNS device that the object can be shared within the first CPNS service group, and
wherein based on the first notification transmitted by the CPNS server, the object is shared by the CPNS device within the first CPNS service group;

receiving, by the CPNS server, a third request for removing a first CPNS entity from the first CPNS service group;

in response to receiving the third request, the CPNS server:
refers to the device service group table and the administrator service group table to identify an administrator of the first CPNS service group,
communicates with the administrator of the first CPNS service group to receive approval or denial of the third request from the administrator of the first CPNS service group,
updates the device service group table when the third request is approved, and
transmits a second notification indicating a change of the device service group table to members of the first CPNS service group with reference to the updated device service group table;

transmitting, by the CPNS server, a second notification to the CPNS device, wherein the object is no longer shared with the first CPNS entity within the first CPNS service group based on the second notification transmitted by the CPNS server;

receiving, by the CPNS server, a fourth request from a second CPNS entity for removing a first object from being shared with a second CPNS service group; and in response to receiving the fourth request, the CPNS server:
refers to the service group table to check whether the fourth request is allowed,
updates the service group table such that the first group is not shared with the second CPNS service group,
sends a change notification of the service group table to members of the second CPNS service group except for the second CPNS entity, and
sends a second response to the second CPNS entity without the change notification.

9. The method of claim 8, further comprising:
receiving a specific content and a fifth request to share the specific content with the first CPNS service group from the CPNS device, the specific content being stored in association with the first CPNS service group in the CPNS server.

10. The method of claim 9, further comprising:
transmitting a third response indicating whether the specific content was shared with the first CPNS service group to the CPNS device that sent the fifth request.

11. The method of claim 8, further comprising:
receiving service group information for the first CPNS service group from the CPNS device, the service group information being stored in association with the first CPNS service group in the CPNS server.

12. The method of claim 11, wherein the service group information includes authorization information identifying how a request for the first CPNS service group is to be processed.

13. The method of claim 12, further comprising:
transmitting a request to authorize a sixth request to share a content with the first CPNS service group; and
receiving a confirmation response to the sixth request.

14. The method of claim 8, wherein the CPNS device is a gateway or a personal network element (PNE).

15. A converged personal network service (CPNS) device for managing a service group in a converged personal network service (CPNS) enabler, the CPNS enabler including a CPNS server and a plurality of CPNS entities, the CPNS device comprising:
a receiver/transmitter device; and
a computer processor configured to:
transmit, via the receiver/transmitter device, a first request to create a first CPNS service group to the CPNS server, wherein the first request includes a CPNS service group number and an object to be shared in the first CPNS service group,
wherein a service group table is created by the CPNS server using the CPNS service group number and the object to be shared in the first CPNS service group which are included in the first request when the first request is received, the service group table indicating a relationship between the object to be shared in the first CPNS service group and the CPNS service group number, and the service group table further indicating a condition for sharing the object within the first CPNS service group;

receive, via the receiver/transmitter device, a second request to provide member information for the first CPNS service group from the CPNS server in response to the first request;

transmit, via the receiver/transmitter device, the member information for the first CPNS service group to the CPNS server in response to the second request, wherein the member information identifies one or more CPNS entities that belong to the first CPNS service group, wherein a service group table is created by the CPNS server using the CPNS service group number and the object to be shared in the first CPNS service group which are included in the first request when the first request is received, the service group table indicating a relationship between the object to be shared in the first CPNS service group and the CPNS service group number, and the service group table further indicating a condition for sharing the object within the first CPNS service group;

receive, via the receiver/transmitter device, a first response indicating the creation of the first CPNS service group from the CPNS server;

transmit, via the receiver/transmitter device, administrator information for the first CPNS service group to the CPNS server, wherein the administrator information identifies at least one of the one or more CPNS entities, wherein an administrator service group table is created by the CPNS server using the administrator information received from the CPNS device when the administrator information is received, the administrator service group table indicating that the at least one of the one or more CPNS entities is designated to be an administrator of the first CPNS service group, and the administrator service group table further indicating rights that each of the administrators of the first CPNS service group has;

in response to determining that the condition indicated by the service group table indicates that an authorization of the administrator is required for sharing the object within the first CPNS service group, the CPNS server:
  refers to the administrator service group table to identify the administrator of the first CPNS service group, and
  checks whether the administrator has rights to authorize the sharing of the object;

in response to determining that the administrator has rights to authorize the sharing of the object, the CPNS server further:
  communicates with the administrator of the first CPNS service group to receive approval or denial of sharing the object within the first CPNS service group, and
  transmits a first notification to the CPNS device that the object can be shared within the first CPNS service group;
  share the object within the first CPNS service group based on the first notification received from the CPNS server;

receiving, by the CPNS server, a third request for removing a first CPNS entity from the first CPNS service group;

in response to receiving the third request, the CPNS server;
  refers to the device service group table and the administrator service group table to identify an administrator of the first CPNS service group,
  communicates with the administrator of the first CPNS service group to receive approval or denial of the third request from the administrator of the first CPNS service group,
  updates the device service group table when the third request is approved, and
  notifies a change of the device service group table to members of the first CPNS service group with reference to the updated device service group table;
  receive a second notification from the CPNS server, wherein the object is no longer shared with the first CPNS entity within the first CPNS service group based on the second notification received from the CPNS server;
  receive, by the CPNS server, a fourth request from a second CPNS entity for removing a first object from being shared with a second CPNS service group; and
in response to receiving the fourth request, the CPNS server:
  refers to the service group table to check whether the fourth request is allowed,
  updates the service group table such that the first object is not shared with the second CPNS service group,
  sends a change notification of the service group table to members of the second CPNS service group except for the second CPNS entity, and
  sends a second response to the second CPNS entity without the change notification.

16. The CPNS device of claim 15, wherein the processor is further configured to transmit a specific content and a fifth request to share the specific content with the first CPNS service group to the CPNS server, the specific content being stored in association with the first CPNS service group in the CPNS server.

17. The CPNS device of claim 16, wherein the processor is further configured to receive, from the CPNS server, a third response indicating whether the specific content was shared with the first CPNS service group.

18. The CPNS device of claim 15, wherein the processor is further configured to transmit service group information for the first CPNS service group to the CPNS server, the service group information being stored in association with the first CPNS service group in the CPNS server.

19. The CPNS device of claim 18, wherein the service group information includes authorization information identifying how a request for the first CPNS service group is to be processed.

20. The CPNS device of claim 15, wherein the CPNS device is a gateway or a personal network element (PNE).

* * * * *